(No Model.)

C. D. BAILEY.
FENDER FOR VEHICLE BODIES.

No. 333,497. Patented Jan. 5, 1886.

Witnesses:

Inventor
Charles D. Bailey.
By J. B. Lawyer
Atty

UNITED STATES PATENT OFFICE.

CHARLES D. BAILEY, OF HARTLAND, VERMONT.

FENDER FOR VEHICLE-BODIES.

SPECIFICATION forming part of Letters Patent No. 333,497, dated January 5, 1886.

Application filed July 14, 1885. Serial No. 171,570. (No model.)

*To all whom it may concern:*

Be it known that I, CHARLES D. BAILEY, a citizen of the United States, residing at Hartland, in the county of Windsor and State of Vermont, have invented certain new and useful Improvements in Fenders for Vehicle-Bodies; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to guards or chafing-irons for wagons and other wheeled vehicles in which rollers are used to protect the body of the vehicle from coming in contact with the wheel; and it consists in the novel construction of the frame or plates supporting the roller and the facility for securing it in position.

Reference is to be had to the accompanying drawings, forming a part of the specification, in which similar letters of reference indicate corresponding parts in both the figures.

Figure 1:
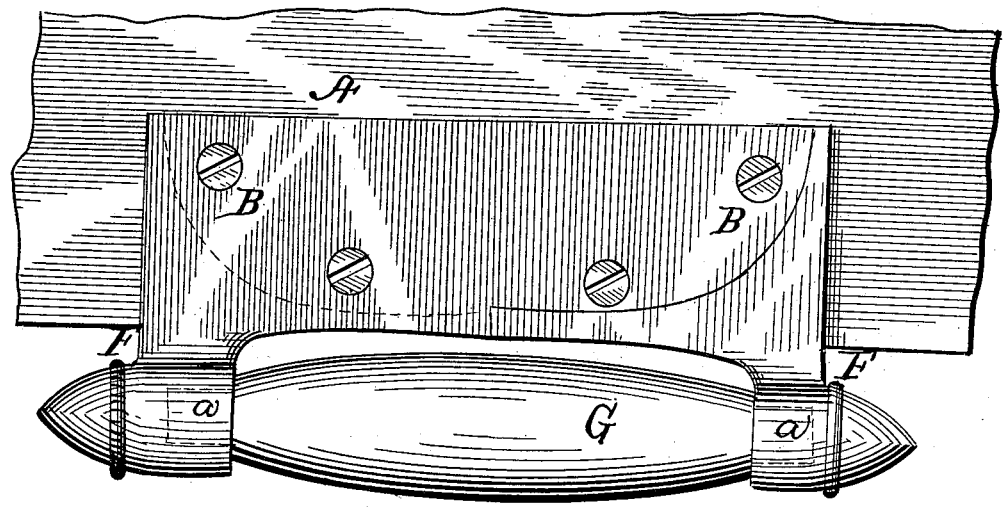
Figure 2:
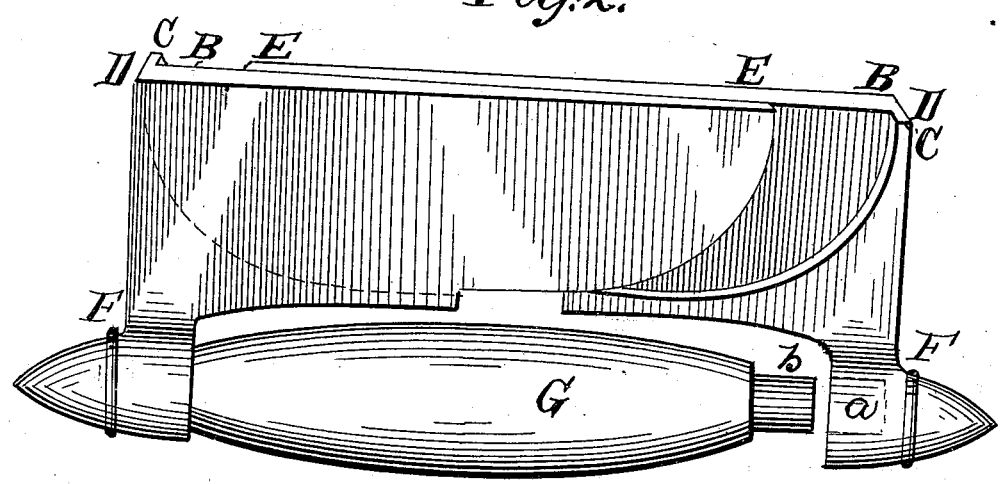

Figure 1 represents a side view of the body of a wagon in part with my invention applied. Fig. 2 is a perspective view of my invention.

A indicates one side of the wagon-body to which my improvement is secured, and carries a roller for the wheel to come in contact with instead of striking the body and disfiguring it, and, besides, allows the body to ride up over the wheel more readily than against a rigid piece of iron, which is generally used.

B B are the plates in position and supporting the roller G, as shown in Fig. 1.

Fig. 2 represents the plates and roller previous to being placed upon the wagon-body. The plates are cast with a flange or shoulder, as shown at C. These plates also diminish in thickness from D to E, so that when they are placed together they are of uniform thickness throughout. The arms F of the plates are provided with sockets $a$, to receive the spindles $b$ of the roller G, the roller being of a convex form, as shown in the drawings.

To attach the fender to a wagon is to place the spindles of the roller into the sockets of each of the plates, then close the plates together, the roller is secured in position, the screw-holes, being previously drilled through the plates, come directly opposite to each other, and the fender is ready to be attached to the body of a wagon or other vehicle.

Having thus described my invention, what I claim as new, and desire to secure by Letters Patent, is—

In a fender for wagons or other vehicles, the plates B B, diminishing in thickness from D to E, and provided with shoulders or flanges C, arm F, and sockets $a$, the said sockets adapted to receive the spindles $b$ of the roller G, for the purpose herein shown and described.

In testimony whereof I affix my signature in presence of two witnesses.

CHARLES D. BAILEY.

Witnesses:
F. P. MARTIN,
C. S. STICKNEY.